United States Patent Office 2,940,912
Patented June 14, 1960

2,940,912

INITIATION OF POLYMERIZATION BY PRE-IRRADIATED SOLID CARBOXYLIC ACIDS, AMIDES AND NITRILES

Blaine C. McKusick, Wilmington, Del., assignor to E. I. du Pont de Nemours and Company, Wilmington, Del., a corporation of Delaware No Drawing. Filed Oct. 1, 1956, Ser. No. 612,930

18 Claims. (Cl. 204—154)

This invention relates to the addition polymerization of vinylidene, including vinyl, compounds.

Polymers of compounds containing ethylenic unsaturation are commercially quite important for use as films, fibers, molded objects, etc. Several methods have been employed for the initiation of polymerization of ethylenically-unsaturated monomers, e.g., use of free radical-type promoters and particularly the peroxy compounds. Ionizing irradiation has also been proposed to effect polymerization of vinyl compounds as in British Patent 665,-262. The polymerization is shown to take place only when the polymerizable monomeric materials are subjected to irradiation, i.e., the polymerization can be stopped at any desired degree within a fraction of a second upon cessation of irradiation. It is the conclusion from such work that the monomers themselves must be subjected to irradiation to be polymerized by such initiation.

An object of this invention is, consequently, provision of a novel method of initiating the polymerization of ethylenically-unsaturated compounds, vinyl compounds in particular.

A particular object is provision of a new method for initiating the polymerization of monomeric vinyl compounds by the use of ionizing radiation which does not directly touch the monomer.

The above-mentioned and yet other objects are achieved in accordance with this invention by a process which comprises (a) subjecting a crystalline non-addition-polymerizable monomeric aliphatic carboxylic acid, amide or nitrile to ionizing irradiation until a substantial amount of free radicals is formed, (b) introducing the irradiated aliphatic compound to a substantially oxygen-free system containing an addition-polymerizable, ethylenically-unsaturated compound, and (c) separating the polymer thus formed.

In one embodiment of this invention, a volatile monomer is employed in the gaseous state with a substantially non-volatile polyfunctional aliphatic compound containing at least one carboxylic acid group which compound has previously been subjected to ionizing irradiation. Under such conditions extremely high molecular weight polymers are formed.

In the polymerization of vinyl monomers by the use of previously irradiated crystalline aliphatic organic monomeric compounds, it is necessary that the compound retain its crystalline properties at the temperature employed, e.g., temperatures of up to 50° C. The preferred crystalline compounds are those that retain a highly crystalline state at even higher temperatures. The compounds that meet these requirements are preferably polyfunctional, and those found most useful have at least one carboxylic acid, carboxylic-amide or nitrile group. The compounds usually have from 2–10 carbons.

The dibasic acids that are particularly useful include adipic, glutaric, malonic, succinic, and alkyl substituted acids, e.g., $\alpha,\alpha,\alpha',\alpha'$-tetramethyladipic. Amino acids that are useful include glycine, alanine, methionine, glutamic, hippuric and $\alpha$-aminobutyric acids. Amides include hexamethylene dicaproamide, N,N'-di-n-butyladipamide and 2,5-diketopiperazine. An example of a useful dinitrile is $\alpha,\alpha,\alpha',\alpha'$-tetramethyladiponitrile.

Compounds of the above types when exposed to ionizing radiation exhibit high paramagnetic resonance. This property persists for periods of up to several days, particularly if the irradiated crystalline material is maintained under oxygen-free conditions and at temperatures below 40° C.

For the purpose of initiating polymerization of ethylenically-unsaturated monomers, the concentration of free radicals in the crystalline polyfunctional material is within the range of $10^{14}$ to $10^{19}$ per cubic centimeter of the solid. When the quantity of free radicals drops below this range, the crystalline compounds are not effective polymerization initiators. It is generally not feasible to obtain crystalline materials containing more than $10^{19}$ free radicals per cubic centimeter since the radicals are then present in a sufficiently high concentration to react with each other and rapidly lower their concentration to about the latter value.

The free radical concentration is determined by independent measurement of the paramagnetic resonance. This method has been described by Hutchison et al., J. Chem. Phys. 20, 1485–6 (1952).

The free radicals are formed in the crystalline compounds by ionizing radiation. In the term "ionizing radiation" is included both radiation in the form sometimes regarded as particle radiation and radiation in the form sometimes regarded as ionizing electromagnetic radiation.

By "particle radiation" is meant an emission of accelerated electrons or nuclear particles such as protons, neutrons, alpha-particles, deuterons, beta-particles, or the like, so that the said particle impinges upon the monomeric aliphatic carboxylic acid, amide, or nitrile. The charged particles can be accelerated by means of a suitable voltage gradient, using such devices as a cathode ray tube, a resonant cavity accelerator, a Van de Graaff accelerator, a betatron, a synchrotron, a cyclotron or the like, as is well known to those skilled in the art. Neutron radiation can be produced by bombardment of selected light metal (e.g., beryllium) targets with high energy positive particles. In addition, particle radiation suitable for carrying out the process of the invention can be obtained from an atomic pile, or from radioactive isotopes or from other natural or artificial radioactive materials.

By "ionizing electromagnetic radiation" is meant radiation of the type produced when a metal target (e.g., tungsten) is bombarded by electrons possessing appropriate energy. Such radiation is conventionally termed X-ray. In addition to X-rays produced as indicated above, ionizing electromagnetic radiation suitable for carrying out the process of the invention can be obtained from a nuclear reactor ("pile") or from natural or artificial radioactive material, for example, cobalt 60. In all of these latter cases the radiation is conventionally termed gamma rays.

It is recognized that the energy characteristics of one form of ionizing radiation can be expressed in terms which are appropriate for another form. Thus, it is acceptable to refer to energy equivalents between, for example, radiation commonly considered as particle radiation and radiation commonly considered as wave or electromagnetic radiation. In the latter case reference can be made to the energy of the individual photons. In the process of this invention, radiation in which the individual particles or photons have an energy of 0.1 m.e.v. and over is preferred. With radiation in this range of energy, free radicals can be obtained from the crystalline materials with a minimum time of exposure to the radiation, permitting maximum efficiency in utilization of the radiation. Particles or photons with an energy of 0.5–4.0 m.e.v. are the most useful from a practical standpoint. Electrons in this energy range are especially preferred in contrast to particles such as high energy protons or alpha particles to keep overheating effects on the crystalline material at a minimum. Furthermore, a higher rate of energy absorption is generally achieved with electrons than when X-rays or gamma rays are used.

An absorption of energy of at least 0.1 watt-sec./g. in the material irradiated by the ionizing radiation is necessary since lower degrees of exposure do not give an adequate number of free radicals. The number of free radicals usually increases with increasing absorption of energy. The upper absorption limit depends on the concentration of free radicals desired and on the radiation resistance of the crystalline material. Energy absorptions as high as 2,000 to 30,000 watt-sec./g. can be achieved but the most useful range is 100 to 1,500 watt-sec./g. The exposure to high-energy electrons can be carried out in one slow pass through the electron beam or in several faster ones and can be conducted at any convenient amperage. The use of many passes reduces heating of the sample. The rate of energy absorption when X-rays or gamma-rays are employed is sufficiently low that local heating is avoided even when the sample remains stationary under the beam.

The vinylidene-type monomers polymerizable by the process of this invention are those that are addition polymerizable by free radical initiators. Preferably the monomers have the $CH_2=C<$ group. Included are the olefins such as ethylene and isobutylene; acrylyl and alkacrylyl compounds, e.g., acrylic and methacrylic acids, esters, nitriles and amides—for example, acrylonitrile, ethyl acrylate and methyl methacrylate; vinyl and vinylidene fluoride; vinyl carboxylates, e.g., vinyl acetate; and other vinyl derivatives such as vinylpyridine, styrene, vinyl ethyl ether. Polymerizable compounds with a plurality of ethylenic double bonds that can also be employed include butadiene, 2-chlorobutadiene and 2-fluorobutadiene. Perfluoroethylenes such as chlorotrifluoroethylene and tetrafluoroethylene can also be polymerized by the process of this invention.

As noted above, preferably the monomers employed in the invention are volatile and polymerization takes place to produce polymers of extremely high molecular weight. Liquid monomers can, however, also be used to yield similar products.

The temperature involved in the irradiation of the carboxylic acid or derivative is within the range of —180° C. to 60° C. with 0–10° C. preferred. Higher temperatures are not conducive to the retention of catalytic activity in the crystalline carboxylic acid, amide or nitrile. The temperature for polymerization can vary within equally wide limits but is preferably 0–40° C.

The instant process requires substantially oxygen-free conditions to prevent loss of activity of the irradiated crystalline initiator. This can be done by the use of an inert diluent or by use of reduced pressure.

It will be seen that this invention provides a method of initiating polymerization without the direct use of irradiation on the monomers. This provides a more versatile process and can be more efficient and avoid special containers and the requirement for the irradiation source next to the polymerization equipment.

The polymers thus obtained are usually readily separated from the crystalline initiator. In general the highly crystalline initiators are water soluble, whereas the polymers are generally water insoluble. Any excess of initiator present in the polymer can therefore be removed by washing with water, although other selective solvents for separation of crystalline initiators from polymer can be employed. The polymer obtained by the process of this invention has end groups which arise from the crystalline initiator, i.e., are fragments of the initiator. The polymers thus obtained when carboxy-containing crystalline initiator is used have increased electrical conductivity as compared to polymers generally available otherwise. Articles made from the polymers of this invention have a decreased tendency to build up high charges of static electricity. The products of this invention possess the general utilities of polymethacrylates, polyethylenes, and the like. They are consequently useful for the preparation of films, fibers, light-conducting shapes ("Lucite"), etc.

The following examples in which the parts are by weight are given to illustrate, but not to limit, the process of this invention.

*Example I*

Two hundred parts of glycine was sealed into an evacuated glass tube having walls 1 mm. thick. The tube, which was at 0–20° C., was given one hundred 1.1-second exposures to a beam of 2-m.e.v. electrons, the power of the beam being 10 watts/cm.$^2$. The absorption of energy by the glycine was 1500 watt-sec./g. The tube was then attached to an evacuated flask containing degassed methyl methacrylate. A thin glass wall between the flask and the tube was broken, thus exposing the irradiated glycine to methyl methacrylate vapor at 0.1 mm. of mercury pressure. After 70 hours in the dark the apparatus was opened and found to contain a mixture of glycine and polymethyl methacrylate. The mixture was stirred with 5,000 parts of water for 30 minutes. The resultant mixture was filtered in order to separate 28 parts of polymethyl methacrylate. The relative viscosity of a 0.1% solution of the purified polymer in ethylene glycol was 1.485, corresponding to a molecular weight of about 2,500,000.

No polymer was formed under the same conditions with glycine that had not been irradiated.

*Example II*

Two hundred parts of succinic acid was successively irradiated and exposed to methyl methacrylate vapor under the conditions of Example I. Polymethyl methacrylate (2 parts) having a molecular weight of about 130,000 was obtained.

The embodiment of the invention in which an exclusive property or privilege is claimed are defined as follows:

1. The process of polymerizing an addition-polymerizable, ethylenically-unsaturated monomer which comprises sequentially (1) irradiating a solid, crystalline, saturated nonpolymerizable member of the group consisting of aliphatic carboxylic acids of 2–10 carbons and compounds hydrolyzable thereto, said member having a crystalline melting point of at least 50° C., with about 0.1–30,000 watt-sec./g. of ionizing radiation having an energy of at least 0.1 m.e.v. to produce free radicals therein, and (2) introducing the irradiated member into a substantially oxygen-free system containing said addition-polymerizable, ethylenically-unsaturated monomer, the free radicals in the irradiated member serving to initiate the polymerization.

2. The process of claim 1 in which the solid nonpolymerizable member is polyfunctional.

3. The process of claim 1 in which the solid nonpolymerizable member is a dicarboxylic aliphatic acid.

4. The process of claim 3 in which the solid nonpolymerizable member is succinic acid.

5. The process of claim 3 in which the solid nonpolymerizable member is adipic acid.

6. The process of claim 1 in which the solid nonpolymerizable member is an amino acid.

7. The process of claim 6 in which the solid nonpolymerizable member is glycine.

8. The process of claim 1 in which the solid nonpolymerizable member is hexamethylene dicaproamide.

9. The process of claim 1 in which the solid nonpolymerizable member is $\alpha,\alpha,\alpha',\alpha'$-tetramethyladiponitrile.

10. The process of claim 1 in which the ionizing radiation is particle radiation.

11. The process of claim 1 in which the ionizing radiation is electromagnetic radiation.

12. The process of claim 1 in which the addition-polymerizable, ethylenically-unsaturated monomer contains the grouping

13. The process which comprises sequentially (1) irradiating a solid amino acid of 2–10 carbons having a crystalline melting point of at least 50° C. with electrons having an energy of at least 0.1 m.e.v. to produce free radicals therein, and (2) contacting the irradiated amino acid, in the substantial absence of oxygen, with monomeric methyl methacrylate and thereby polymerizing the same.

14. The process which comprises sequentially (1) irradiating solid glycine with electrons having an energy of at least 0.1 m.e.v. to produce free radicals therein, and (2) contacting the irradiated solid glycine, in the substantial absence of oxygen, with monomeric methyl methacrylate and thereby polymerizing the same.

15. The process of claim 14 including the additional step of separating the polymerized methyl methacrylate from the glycine.

16. The process which comprises sequentially (1) irradiating a solid aliphatic dicarboxylic acid of 2–10 carbons having a crystalline melting point of at least 50° C. with electrons having an energy of at least 0.1 m.e.v. to produce free radicals therein, and (2) contacting the irradiated dicarboxylic acid, in the substantial absence of oxygen, with monomeric methyl methacrylate and thereby polymerizing the same.

17. The process which comprises sequentially (1) irradiating solid succinic acid with electrons having an energy of at least 0.1 m.e.v. to produce free radicals therein, and (2) contacting the irradiated solid succinic acid, in the substantial absence of oxygen, with monomeric methyl methacrylate and thereby polymerizing the same.

18. The process of claim 16 including the additional step of separating the polymerized methyl methacrylate from the succinic acid.

References Cited in the file of this patent

UNITED STATES PATENTS

| 2,666,025 | Nozaki | Jan. 12, 1954 |
| 2,766,220 | Kantor | Oct. 9, 1956 |

FOREIGN PATENTS

| 665,262 | Great Britain | Jan. 23, 1952 |

OTHER REFERENCES

Wall: ONR Symposium Report ACR–2, pp. 147–148, Dec. 15, 1954.

Schmitz et al.: "Science," vol. 113, pp. 718, 719, June 22, 1951.

Ballantine et al.: "J. of Polymer Science," vol. 19, No. 91, January 1956, pp. 219–224.

B.N.L. 367, "Quarterly Progress Report," July 1–Sept. 30, 1955, pp. 27, 28; February 1956. (Copy available from Office of Technical Services, Washington 25, D.C.)

B.N.L. 375, "Quarterly Progress Report," Oct. 1–Dec. 31, 1955, p. 26, April 1956. (Copy available from Office of Technical Services, Washington 25, D.C.)